(12) United States Patent
Guillon et al.

(10) Patent No.: US 6,235,915 B1
(45) Date of Patent: May 22, 2001

(54) CATALYST FOR USE IN HYDROGENATING AROMATIC COMPOUNDS IN A HYDROCARBON-CONTAINING FEED CONTAINING SULFUR-CONTAINING COMPOUNDS

(75) Inventors: Emmanuelle Guillon, Paris; Denis Uzio, Marly le Roi; Blaise Didillon, Rueil Malmaison, all of (FR)

(73) Assignee: Institut Francåis du Petrole, Rueil Malmaison Cedex (FR)

( * ) Notice: Subject to any disclaimer, the term of this patent is extended or adjusted under 35 U.S.C. 154(b) by 0 days.

(21) Appl. No.: 09/305,449

(22) Filed: May 6, 1999

(30) Foreign Application Priority Data

May 7, 1998 (FR) .................................................. 98 05847

(51) Int. Cl.$^7$ ............................. C07C 51/36; C07C 51/00
(52) U.S. Cl. ........................................... 554/142; 157/158
(58) Field of Search .................................. 502/302, 303, 502/339, 333, 334; 554/142, 157, 158

(56) References Cited

U.S. PATENT DOCUMENTS

| 3,943,053 | 3/1976 | Kovach et al. | 208/143 |
| 5,922,639 | * 7/1999 | Alario | 502/230 |

FOREIGN PATENT DOCUMENTS

0 751 204    1/1997   (EP) .

* cited by examiner

*Primary Examiner*—Johann Richter
*Assistant Examiner*—Diedra Faulkner
(74) *Attorney, Agent, or Firm*—Millen, White, Zelano & Branigan, P.C.

(57) ABSTRACT

A catalyst for hydrogenating aromatic compounds contained in feeds containing sulfur-containing compounds comprises platinum, palladium, fluorine and chlorine, on a support principally comprising alumina. This catalyst is of particular application to hydrogenating aromatic compounds with boiling points of more than 100° C. in hydrocarbon-containing feeds containing sulfur-containing compounds.

20 Claims, No Drawings

CATALYST FOR USE IN HYDROGENATING AROMATIC COMPOUNDS IN A HYDROCARBON-CONTAINING FEED CONTAINING SULFUR-CONTAINING COMPOUNDS

FIELD OF THE INVENTION

The present invention relates to a catalyst for use in processes for hydrogenating unsaturated hydrocarbon-containing feeds, and more particularly in hydrogenation processes enabling aromatic compounds contained in feeds containing traces of sulfur-containing compounds to be hydrogenated. It also relates to the preparation of this catalyst and to processes using the catalyst.

BACKGROUND OF THE INVENTION

Petroleum cuts must be pre-treated before use to eliminate unwanted compounds and to obtain products which satisfy current regulations. In that context, gas oil cut hydrogenation is of particular importance because of new regulations regarding sulfur and aromatic compound levels imposed for that type of fuel.

Desulfurization is generally carried out under conditions and using catalysts which are not also capable of hydrogenating the aromatic compounds. Thus a second treatment has to be carried out on the cut for which the sulfur content has already been reduced, to hydrogenate the aromatic compounds contained in that cut. This step is generally effected by bringing the cut, in the presence of hydrogen, into contact with a catalyst which is generally based on a noble metal. However, since the desulfurization process can never completely eliminate the sulfur-containing and nitrogen-containing compounds, the catalysts used must be able to operate in the presence of those compounds, which are powerful inhibitors of the activity of noble metals, and they must as a consequence have good thio-resistant properties.

A group of catalysts with thio-resistant properties has already been identified. Platinum and palladium based catalysts have been described in respect of their thio-resistance. When using an alumina type support (U.S. Pat. No. 3,943,053), it is reported that the metal contents and the conditions for preparation must be precisely controlled. This constraint causes distinct problems in terms of flexibility during industrial scale-up for these formulations. The use of supports based on silica-aluminas or zeolites has also been reported. Examples are U.S. Pat. Nos. 4,960,505, 5,308,814 and 5,151,172. Those documents teach that the type of zeolite which can produce the desired properties is highly specific. Further, the use of such supports has a number of major disadvantages, among them their preparation, which includes a forming step requiring the use of mineral binders such as aluminas. The preparation methods thus must allow noble metals to be selectively deposited onto the zeolitic material as opposed to deposit onto the binder, which is an additional restriction with that type of catalyst.

SUMMARY OF THE INVENTION

We have now discovered, and this forms the subject matter of the present invention, a novel catalyst constituted by platinum, palladium, fluorine and/or chlorine, on an alumina support. Such a catalyst can advantageously be used to hydrogenate aromatic compounds in feeds containing sulfur-containing compounds.

In a further aspect, the invention concerns the use of said catalyst, more particularly for treating cycle oils from catalytic cracking processes. However, this catalyst is also suitable for any process aimed at hydrogenating all or a portion of the aromatic compounds in a feed containing traces of sulfur-containing compounds, such as hydrogenating aromatic compounds in edible oils.

DETAILED DESCRIPTION OF THE INVENTION

In general, the catalyst of the invention comprises two noble metals from group VIII of the periodic table, namely platinum and palladium, also at least one halogen selected from fluorine and chlorine, on a support principally comprising alumina.

The support is generally selected from transition aluminas. This type of alumina has a specific surface area, determined using techniques which are known to the skilled person, in the range 100 to 500 $m^2/g$, preferably in the range 150 to 250 $m^2/g$. The alumina can be used in the form of a powder or it is preformed in the form of beads or extrudates.

The total platinum and palladium content (expressed as the % by weight of noble metal) is 0.1% to 5% by weight, preferably 0.5% to 2% by weight. The palladium/platinum atomic is preferably 0.7/1 to 5/1. The amount of fluorine when present is generally 0.3% to 1.5% by weight. The chlorine content, when present, is generally 0.3% to 2% by weight.

The components constituting the catalyst can be introduced separately into the catalyst, using successive addition steps using solutions of one or more elements, or simultaneously, using a common solution of elements. When several impregnation steps are used to obtain the catalyst, drying or activation steps (calcining or reduction) can be carried out between two successive impregnation steps.

The platinum or palladium precursors can be complexed water-soluble compounds, such as hexachloroplatinic acid, chloro- or hydroxo aminated platinum complexes, palladium nitrate, alkali metal chloropalladates, or co-ordination complexes which are soluble in organic solvents, such as bis-acetylacetonate complexes of platinum or palladium.

The halogenated compounds are preferably added using an aqueous solution prepared from the corresponding mineral acids, for example HF or HCl. Decomposition of organofluorinated and/or organochlorinated compounds on the catalyst is a method which can also be used for the present invention. In the case of fluorine, this method can avoid the use of hydrofluoric acid, which is now regulated, during preparation of the catalyst.

Catalyst preparation is generally ended by a heat treatment step carried out in air (calcining). Before use, the catalyst is reduced by passing a gaseous mixture containing hydrogen over the catalyst heated to a temperature which is generally in the range 100° C. to 550° C.

Depending on the sulfur content in the feed to be treated, it may be advantageous to pre-treat the feed to reduce the sulfur content using conventional hydrotreatment processes. The sulfur content of the feed which can be treated by the process of the invention is generally less than 2000 ppm by weight, preferably 0.5 to 500 ppm by weight.

The hydrogenation process of the invention is generally carried out at temperatures of 150° C. to 350° C., preferably 200° C. to 320° C. The operating pressure is generally 1.5 to 10 MPa, preferably 3 to 9 MPa. The space velocity, expressed as the volume of liquid feed treated per volume of catalyst per hour, is generally 0.1 to 10 $h^{-1}$. The hydrogen/feed ratio used is expressed as the volume of hydrogen measured under normal conditions per volume of liquid feed; it is generally 100/1 to 2000/1.

The entire disclosure of all applications, patents and publications, cited above and below, and of corresponding French application 98/05847, filed May 7, 1998, are hereby incorporated by reference.

The following examples illustrate the invention without limiting its scope.

EXAMPLE 1

Preparation of a Pt/Alumina Catalyst

The alumina used was a cubic gamma type alumina. It was in the form of beads. Its specific surface area was 191 $m^2/g$ and its pore volume was 0.59 $cm^3/g$. The preparation method used consisted of excess impregnation of the alumina beads using a quantity of platinum bis-acetylacetonate dissolved in a volume of toluene equivalent to 5 times the pore volume of the support used. After 48 hours of exchange, the catalyst was rinsed, dried in air for 12 hours, then calcined for 2 hours at 350° C. in a stream of air. The platinum content of the catalyst obtained (A) was 1.3% by weight.

EXAMPLE 2

Preparation of a Pd/Alumina Catalyst

The method used was the same as that described in Example 1, but this time palladium bis-acetylacetonate was used. The palladium content of catalyst (B) obtained was 0.74% by weight.

EXAMPLE 3

Preparation of a Pt-Pd/Alumina Catalyst

This catalyst was obtained by excess co-impregnation of platinum and palladium bis-acetylacetonate dissolved in toluene. After 48 h of exchange, the catalyst was rinsed, dried then calcined for 2 h at 350° C. in a stream of air. The catalyst obtained (C) had the following metal content:

0.62% by weight of platinum;
0.81% by weight of palladium.

EXAMPLE 4

Preparation of a Pt/Alumina+Cl+F Catalyst

The method used consisted of successively introducing the elements using an excess of solution. Firstly, the chlorine was introduced, then the fluorine and finally the platinum. The support was successively treated with a hydrochloric acid solution, 2% Cl for 30 minutes to obtain the correct quantity of chlorine on the support. After eliminating the solution, a hydrofluoric acid solution was brought into contact with the chlorinated support for 1 h 30 min. The support was then rinsed and the platinum was impregnated using hexachloroplatinic acid. After 12 hours exchange, the catalyst was dried in dry air for 2 hours at 530° C. Catalyst (D) obtained thus contained:

0.58% by weight of platinum;
1.49% by weight of chlorine;
0.48% by weight of fluorine.

EXAMPLE 5

Preparation of a Pt-Pd/Alumina+Cl+F Catalyst

This catalyst was prepared from catalyst D of Example 4. After reducing this catalyst, palladium was deposited in a neutral atmosphere, by impregnating with an excess of a precise quantity of palladium bis-acetylacetonate. The catalyst was dried then calcined for 2 hours at 350° C. Catalyst (E) obtained thus contained:

0.58% by weight of platinum;
0.82% by weight of palladium;
0.88% by weight of chlorine;
0.48% by weight of fluorine.

In the following Examples 6 and 7, the catalysts obtained as described in the above examples were evaluated using two catalytic tests, the general operating conditions for which were as follows:

| total pressure: | 40 or 60 bars; |
| --- | --- |
| feed: | see Example 6 or 7; |
| reactor: | upflow |

Before use, the catalyst underwent an activation step in a stream of hydrogen at 450° C. for 2 hours. This reduction could take place either in the reactor for the catalytic test (in situ conditions) or in an additional reduction cell (ex situ conditions).

EXAMPLE 6

Hydrogenating Conditions for a Model Feed

The feed which was treated contained 10% by weight of orthoxylene in heptane, in the presence of 100 ppm of sulfur in the form of dimethyldisulfide.

The catalytic test comprised the following steps, in succession using the same feed:

| First step lasting 10 hours: | |
| --- | --- |
| total pressure | 40 bars |
| HSV | 8 $h^{-1}$ |
| T | 100° C. |
| $H_2HC$ | 400 l/l. |
| Second step lasting 20 hours: | |
| total pressure | 40 bars |
| HSV | 1 $h^{-1}$ |
| T | 200° C. |
| $H_2HC$ | 1000 l/l. |

The aromatic compound conversion for the different catalysts tested was measured during the second step of the catalytic test, at t=20 hours and at t=30 hours. The thio-resistance of the platinum was evaluated by comparing the conversion of the catalyst to that of the monometallic platinum based catalyst (catalyst A). The results are shown in Table 1 below:

TABLE 1

| Catalyst | Conversion at 20 h (%) | Conversion at 30 h (%) |
| --- | --- | --- |
| A | 5.6 | 4.8 |
| B | 0.4 | 0.4 |
| C | 6.7 | 7.8 |
| D | 29.1 | 19.2 |
| E | 44.1 | 42.7 |

It appears that, for the same sulfur content, the aromatic conversion for the Pt—Pd catalyst (catalyst C) increased with respect to the monometallic platinum based catalyst (catalyst A) or to the monometallic palladium based catalyst (catalyst B). This increase was augmented when the platinum was in the presence of chlorine or fluorine (catalyst D). However, the increase in conversion was the highest for the catalyst which was in the simultaneous presence of platinum, palladium, fluorine and chlorine (catalyst E).

Further, for catalyst E, the conversion remained stable with time, in contrast to catalyst D; in other words, the deactivation phenomenon was less significant for this catalyst. In conclusion, catalyst E had better thio-resistant properties.

EXAMPLE 7

Hydrogenating Conversion for an LCO Type Feed
Table 2 below shows the characteristics of the LCO type feed.

TABLE 2

| Characteristics | LCO feed |
|---|---|
| Density at 20° C. | 0.904 |
| Sulfur (ppm) | 109 |
| Nitrogen (ppm) | 132 |
| ASTM D 86 distillation (° C.) | |
| Initial point | 166 |
| 10% by weight | 210 |
| 50% by weight | 266 |
| 90% by weight | 343 |
| End point | 415 |
| Aromatic compound composition (% by weight) | |
| Mono-aromatics | 44 |
| Di-aromatics | 27 |
| Tri-aromatics | 3 |
| Total | 74 |
| AC* | 43 |

*AC = Aromatic carbon, measured by NMR.

The catalytic performances of the catalysts described in the above Examples were then evaluated during a catalytic test carried out under the following operating conditions:

| | |
|---|---|
| total pressure | 60 bars; |
| HSV | 1 h$^{-1}$; |
| T | 280° C.; |
| H$_2$/HC | 450 l/l. |

TABLE 3 below shows the aromatic compound conversion obtained with catalysts D and E.

TABLE 3

| LCO feed | Catalyst D | Catalyst E |
|---|---|---|
| AC* initial feed (% by weight) | 43 | |
| AC* effluent (% by weight) | 28 | 22 |
| % DHAC** | 34.8 | 48.8 |

*AC = Aromatic carbon, measured by NMR.
**DHAC = degree of hydrogenation of aromatic carbon.

Again, in the case of desulfurization of a real feed, catalyst E was superior in terms of conversion, and thus of sulfur resistance, than catalyst D. This type of catalyst can thus enable feeds containing relatively large amounts of sulfur (110 ppm by weight in this example) to be treated, with a high degree of hydrogenating activity.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A thio-resistant catalyst for use in a processes for hydrogenating unsaturated hydrocarbons in cuts containing low quantities of sulfur, comprising platinum, palladium, fluorine and chlorine, on a support principally comprising alumina, said chlorine and fluorine being present in a ratio which provides a higher conversion of hydrogenation than either fluorine or chlorine used alone.

2. A catalyst according to claim 1, characterized in that the total platinum and palladium content, expressed as the % by weight of noble metal, is 0.1% to 5% by weight and the palladium/platinum atomic ratio is 0.7/1 to 5/1.

3. A catalyst according to claim 1, characterized in that the total platinum and palladium content, expressed as the % by weight of noble metal, is 0.5% to 2% by weight.

4. A catalyst according to claim 1, characterized in that the fluorine content is 0.3% to 1.5% by weight.

5. A catalyst according to claim 1, characterized in that the chlorine content is 0.3% to 2% by weight.

6. A catalyst according to claim 1, characterized in that the support is selected from transition aluminnas.

7. A catalyst according to claim 6, characterized in that the specific surface area of said alumina support is 100 to 500 m$^2$/g.

8. A catalyst according to claim 7, characterized in that the specific surface area of said alumina support is 150 to 250 m$^2$/g.

9. A catalyst according to claim 7, characterized in that the alumina is in the form of a powder or is pre-formed into beads or extrudates.

10. A process for hydrogenating aromatic hydrocarbons in a hydrocarbon cut with a low sulfur content, characterized in that the feed is brought into contact with a catalyst according to claim 1 under hydrogenating conditions.

11. A process according to claim 10, in which the feed to be treated consists of a cycle oil from a catalytic cracking process.

12. A process according to claim 10, in which the sulfur content of the feed to be treated is less than 2000 ppm by weight.

13. A process according to claim 10, in which the sulfur content of the feed to be treated is 0.5 to 500 ppm by weight.

14. A process for hydrogenating aromatic hydrocarbons in an edible oil, characterized in that the feed is brought into contact with a catalyst according to claim 1 under hydrogenating conditions.

15. A catalyst according to claim 2, characterized in that the fluorine content is 0.3% to 1.5% by weight.

16. A catalyst according to claim 2, characterized in that the chlorine content is 0.3% to 2% by weight.

17. A catalyst according to claim 15, characterized in that the chlorine content is 0.3% to 2% by weight.

18. A process for hydrogenating aromatic hydrocarbons in a hydrocarbon cut with a low sulfur content, characterized in that the feed is brought into contact with a catalyst according to claim 2.

19. A process for hydrogenating aromatic hydrocarbons in a hydrocarbon cut with a low sulfur content, characterized in that the feed is brought into contact with a catalyst according to claim 15.

20. A process for hydrogenating aromatic hydrocarbons in a hydrocarbon cut with a low sulfur content, characterized in that the feed is brought into contact with a catalyst according to claim 16.

* * * * *